United States Patent
Kret et al.

(10) Patent No.: US 10,666,693 B1
(45) Date of Patent: May 26, 2020

(54) ENCRYPTING MULTIPLE PARTY CALLS

(71) Applicant: WhatsApp Inc., Menlo Park, CA (US)

(72) Inventors: Ehren Andrew Kret, Sunnyvale, CA (US); Manpreet Singh, Los Altos Hills, CA (US)

(73) Assignee: WhatsApp Inc., Menlo Park, CA (US)

( * ) Notice: Subject to any disclaimer, the term of this patent is extended or adjusted under 35 U.S.C. 154(b) by 23 days.

(21) Appl. No.: 15/965,436

(22) Filed: Apr. 27, 2018

(51) Int. Cl.
*H04L 29/06* (2006.01)
*H04L 12/18* (2006.01)

(52) U.S. Cl.
CPC ...... *H04L 65/1093* (2013.01); *H04L 12/1822* (2013.01); *H04L 63/062* (2013.01); *H04L 65/403* (2013.01); *H04L 65/1069* (2013.01)

(58) Field of Classification Search
None
See application file for complete search history.

(56) References Cited

U.S. PATENT DOCUMENTS

| | | | | |
|---|---|---|---|---|
| 2002/0101997 A1* | 8/2002 | Curtis | ................ | H04L 12/1822 380/279 |
| 2010/0049973 A1* | 2/2010 | Chen | ................ | H04L 9/083 713/163 |
| 2013/0343543 A1* | 12/2013 | Blaisdell | ............ | H04L 65/1006 380/270 |

* cited by examiner

*Primary Examiner* — Antim G Shah
(74) *Attorney, Agent, or Firm* — Fenwick & West LLP

(57) ABSTRACT

A messaging system establishes a secure call session between multiple parties. The call session is secured using an entropy value shared among parties in the call session. During the call session, the messaging system receives an instruction from a party in the call session to modify the call session. The call session may be modified by a party being added or removed from the session. Based on the received instruction, the messaging system performs an entropy value update to ensure that the call session is secure after the modification is made. A new entropy value is generated by a party in the call session and transmitted to other parties in the call session. Using the new entropy value, the messaging system establishes the modified secure call session.

14 Claims, 6 Drawing Sheets

ENCRYPTING MULTIPLE PARTY CALLS

BACKGROUND

This disclosure relates generally to IP-based telephony and more particularly to encrypting IP-based multi-party calls.

Dedicated messaging applications are a common method of online communication. Users use client devices, such as smartphones, to execute the messaging application in order to exchange messages with other users. Messaging applications allow users to send and receive text, images, videos, and other forms of media. One feature provided by some dedicated messaging applications is the ability to call other users of the messaging application. Users communicating via a call desire secure communications to ensure that third parties cannot eavesdrop on information being passed during the call.

However, a problem arises during group calling sessions including more than two users (also called "multi-party calls"). Users in a group calling session may enter or depart the session at any time. Standard encryption techniques may fail to ensure that users who leave an ongoing group call can no longer access the call. For example, in a call of three users, one user may depart the session early. The remaining two users continue to communicate via the call and have an expectation of privacy. However, the third user may still be able to eavesdrop on the call despite no longer being part of the calling session. This inability to secure a group calling session where users can join or leave the call at any time leaves such calls susceptible to eavesdropping by third parties or other forms of attack.

SUMMARY

The above and other issues are addressed by a messaging system that encrypts multiple party calls using an entropy value that is updated when the call session is modified. The messaging system uses encryption keys generated from an entropy value for the call session to encrypt communications streams between client devices of the call session. When parties are added to or removed from the call session, the entropy value is updated to ensure that the communications streams are secure at all times.

The messaging system establishes a secure call session between multiple parties. The call session is secured using encryption keys generated from a common entropy value between parties in the call session. During the call session, the messaging system receives an instruction from a party in the call session to modify the call session. The call session may be modified by adding or removing a party from the session. Additionally, modifications may occur multiple times during a call session, and may be initiated by different parties in the call session. Based on the modification contained in the instruction, the messaging system performs an entropy value update for the call session to ensure that the call session remains secure after the modification is made. An updated entropy value is generated by a party in the call session and transmitted to other parties in the call session. The updated entropy value is used by the client devices of the parties to generate updated encryption keys, and the messaging system establishes the modified secure call session based on the updated encryption keys.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
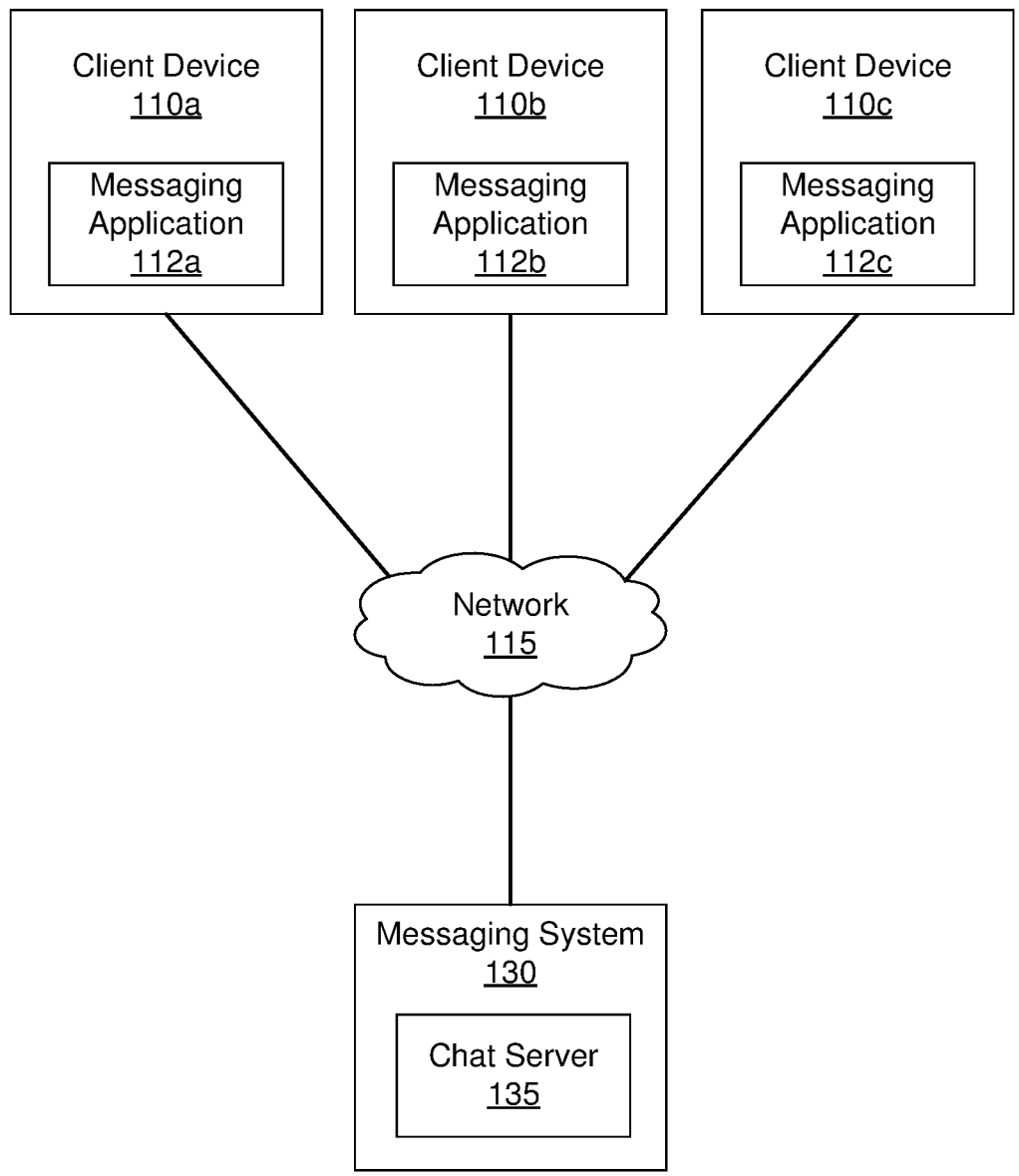
FIG. 1 is a block diagram of a system environment including an electronic messaging system, in accordance with an embodiment.

FIG. 1 is a block diagram of a system environment 100 for a messaging system 130. The system environment 100 shown by FIG. 1 comprises one or more client devices 110 connected to the messaging system 130 via a network 115. Each client device 110 contains a messaging application 112. While only a few client devices 110 and one messaging system 130 are shown in FIG. 1, embodiments of the environment 100 can have many such entities connected to the network 115. In alternative configurations, different and/or additional components may be included in the system environment 100.

FIG. 1 uses like reference numerals to identify like elements. A letter after a reference numeral, such as "110*a*," indicates that the text refers specifically to the element having that particular reference numeral. A reference numeral in the text without a following letter, such as "110," refers to any or all of the elements in the figures bearing that reference numeral. For example, "110" in the text refers to reference numerals "110*a*," "110*b*," and/or "110*c*" in the figures.

A client device 110 is a computing device that can transmit and/or receive data via the network 115. A user may use the client 110 device to perform functions such as exchanging messages using the messaging system 130, communicating with other users via voice or video call, browsing websites on web servers on the network 115, consuming digital content received via the network, and executing software applications. For example, the client device 110 may be a smartphone or a tablet, notebook, or desktop computer. In addition, the client device 110 may be an Internet-of-Things (IoT)-connected device such as a home appliance. The client device 110 may include a display device on which the user may view digital content, such as messages received from the messaging system 130.

The client device 110 may execute one or more applications ("apps") that extend the functionality of the client device. The apps may include a web browser that allows the client device 110 to interact with websites provided by servers connected to the network 115. The apps may also include one or more dedicated apps for accessing the messaging system 130. In one embodiment, the user downloads and installs apps on the client device 110 for specific purposes, such as exchanging messages using the messaging system 130. Alternatively, the functionality of an app may be incorporated into an operating system of the client device 110 or included in other native functionality of the client device.

The messaging application 112 illustrated within the client device 110 in FIG. 1 represents an application for interacting with the messaging system 130 via the network 115. The messaging application 112 enables a user of the client device 110 to exchange messages with other client device users. The messages may include text, images, audio, etc.

The messaging application 112 additionally allows users to make voice and video calls with other users of the messaging system 130. A call connects a user with one or more other users of the messaging system 130 in real-time, and may consist of transferring audio data, video data, or both audio and video data among parties of a call. In one embodiment, parties associated with the call dictate the type or types of data used during the call. A call may be multi-party, wherein more than two parties are associated with the call. During a multi-party call, parties may join or leave the call at any time.

The messaging application 112 maintains a list of contacts on behalf of the user. The contact list includes contact information about other users with whom the user can use the messaging system 130 to communicate. The contact information may include, for example, names, electronic and physical addresses, telephone numbers, pictures, and notes. In one embodiment, the contact information additionally includes public key information used to encrypt messages sent by the user to the contact.

The messaging application 112 additionally holds encryption information used to engage in secure communications between client devices 110. The encryption information may include keys used to establish encrypted communications channels with other clients and the messaging system 130. In one embodiment, the keys include a private/public key pair for the client device 110, as well as the public keys associated with other client devices 110 in the contact list. The encryption information may also include entropy values and session keys used to encrypt communications for a particular call sessions. The encryption information may additionally include seed values used to generate session or other keys used to secure the communications.

The messaging system 130 interacts with the messaging applications 112 of the client devices 110 to support calling and messaging among the users of the devices. The messaging system 130 is remote from the client devices 110 and may be implemented using one or more dedicated computers and/or a cloud computing platform. In one embodiment, the messaging system 130 contains a chat server 135.

The chat server 135 establishes encrypted call sessions initiated by users of the messaging system 130 and transmits updates to the client devices 110 when the parameters of a call session are changed. Call parameters may include the number and identities of parties in the call session, the type or types of data exchanged during the call session, the host party of a call, and other information. In one embodiment, changing the parameters of a call session includes changing (e.g., by a party joining or ending the call) the number and identities of parties in the call.

When a user initiates a call session with another user, the chat server 135 receives the call offer containing an encrypted entropy value and transmits the call offer to the client device 110 of the other user. When the call offer is accepted, the chat server 135 sets up the encrypted call session for the two users. The chat server 135 updates the call parameters when the call session is terminated, when an additional user is invited to join the call session, when a user leaves the call session, or when other events occur.

The chat server 135 additionally selects users in a group call to update the entropy value associated with the call session when required to maintain a secure session, such as when the call parameters change. For example, in the case that during a group call session a user enters or leaves the call, the chat server 135 causes the parties remaining on the call to use a new entropy value in order to securely continue the call session. The entropy value update ensures that the user leaving the call cannot use the prior entropy value associated with the call session to eavesdrop or otherwise compromise the call after leaving. The chat server 135 selects a party remaining in the group call session to generate an updated entropy value and transmits an encrypted copy of the updated entropy value to users of the group call session.

The network 115 comprises any combination of local area and/or wide area networks, using both wired and/or wireless communication systems. In one embodiment, the network 115 uses standard communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 115 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 115 may be represented using any suitable format, such as hypertext markup language (HTML) or extensible markup language (XML). In some embodiments, all or some of the communication links of the network 115 may be encrypted using any suitable technique or techniques.

Figure 2:
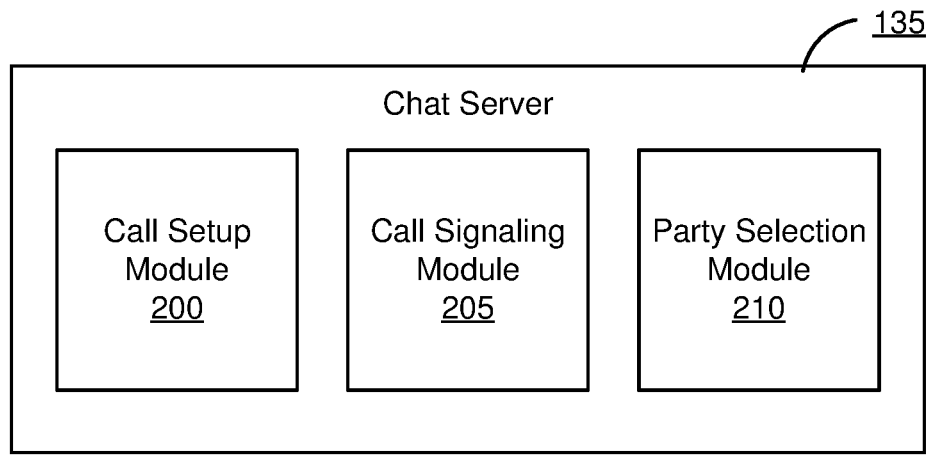
FIG. 2 is a block diagram of an architecture of the chat server, in accordance with an embodiment.

FIG. 2 is a block diagram of an architecture of the chat server, in accordance with an embodiment. The chat server 135 shown in FIG. 2 includes a call setup module 200, a call signaling module 205, and a party selection module 210. In other embodiments, the chat server 135 may include additional, fewer, or different components. Conventional components such as network interfaces, security functions, load balancers, failover servers, management and network operations consoles, and the like are not shown so as to not obscure the details of the system architecture.

The call setup module 200 receives and transmits outgoing call offers from client devices 110 and sets up encrypted call sessions upon acceptance of call offers by receiving parties. The call setup module 200 receives call offers from client devices 110 of the messaging system 130. A call offer is a message indicating that a client device 110 of a user of the messaging system has invited one or more other users (also referred to as "parties") to join a call session. A call offer includes an encrypted entropy value generated by the client device 110. The entropy value is encrypted so that the client device 110 of an invited user can access the value, but the chat server 135 cannot access it. The call offers includes identifiers for the invited parties. An identifier may be a username on a social media system, a phone number, a user identifier number, or another form of unique identification used to identify a client device 110 of a user to invite to the call session. Based on the identifiers in the call offers, the call setup module 200 transmits the call offers and the encrypted entropy values to the client devices 110. Upon receiving notification of acceptance of the call, the call setup module 200 sets up the encrypted call session for the participating parties.

The call signaling module 205 receives notifications from client devices 110 to update the call session when modifications are made to the call session parameters and transmits updates to the participating client devices 110. As described above, a client device 110 may transmit a notification to the chat server 135 in the event of modifications to the parameters of the call session such as a call session ending, a call offer being made to an additional user, a user leaving a multi-party call, or other events. The call signaling module 205 transmits updates to the participating client devices 110 when notified of a parameter change, thus ensuring that all participating parties are aware of changes to parameters of the call session. In the event that a change is made to the parties on a call, the call signaling module 205 transmits an update informing of this change to the client devices 110 remaining in the call session and additionally transmits the update to the party selection module 210. The call signaling module 205 may further receive an identifier of selected party of a call session from the party selection module 210, and transmit a message to the identified party causing that party to update the entropy value used to secure the call session.

The party selection module 210 receives updates regarding changes of parties in call sessions from the call signaling module 205 and instructs parties remaining in the call sessions to update the entropy values used to secure the call sessions. The party selection module 210 identifies the parties remaining in a call session after an update and selects one of the parties to generate a new entropy value for securing the call session. The party selection module 210 may perform the selection at random or based on a heuristic, such as based on the identifiers of the parties or the amounts of time the parties spent in the call session. In one embodiment, the party selection module 210 selects a party to update the entropy value by numerically ranking the identifier numbers of the parties and selecting the party with the lowest identifier number. In another embodiment, the party selection module 210 selects a party to update the entropy value based on the party that has spent the longest time in the call session. The party selection module 210 transmits the identifier of the selected party to the call signaling module 205.

Figure 3:
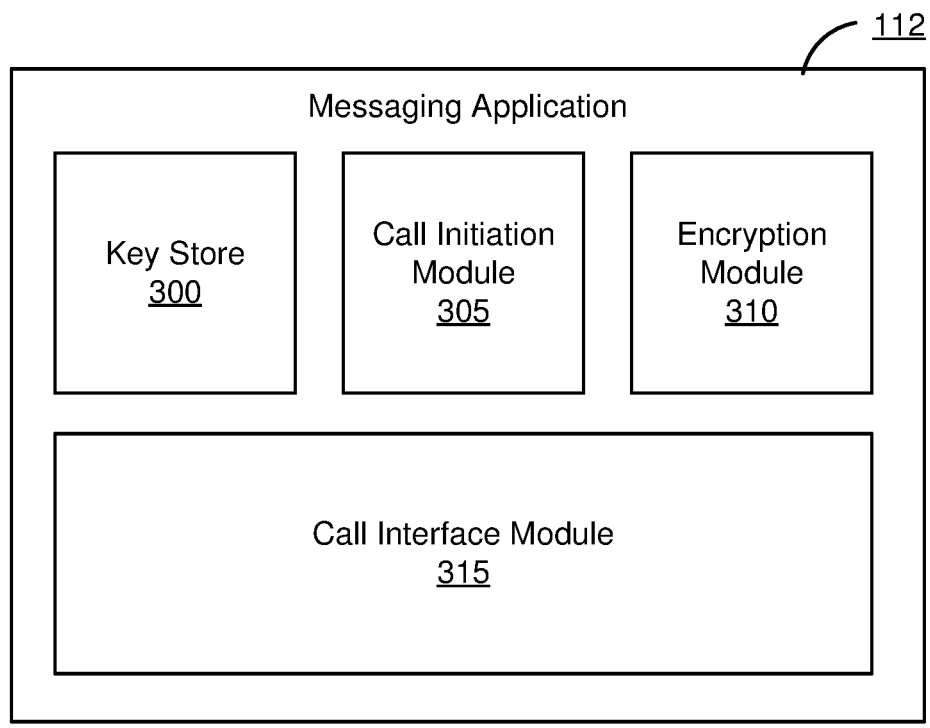
FIG. 3 is a block diagram of an architecture of the client messaging application, in accordance with an embodiment.

FIG. 3 is a block diagram of an architecture of the client messaging application 112, in accordance with an embodiment. The client messaging application 112 includes a key store 300, a call initiation module 305, an encryption module 310, and a call interface module 315. In other embodiments, the client messaging application 112 may include additional, fewer, or different components.

The key store 300 receives and stores encryption keys used by the messaging application 112. These keys may include public/private key pairs for the user, messaging application 112, and/or client device 110. The stored keys may also include public keys associated with contacts of the user maintained by the messaging application 112. The stored keys may also include entropy values and keys generated from entropy values.

In one embodiment, prior to a call session being initiated with a contact, the user and the contact exchange public keys. This key exchange allows the two messaging applications 112 of the users to securely communicate using public key infrastructure-based techniques. Such communications cannot be decrypted by third parties, including the chat server 135. Therefore, a first messaging application 112 can use these techniques to securely send information, such as an entropy value, to a second messaging application.

The call initiation module 305 receives an instruction from the user of the messaging application 112 to initiate a call to another user (the "invited party") and transmits the request to the chat server 135. The call initiation module 305 may receive an instruction to initiate a call to one or more users, each associated with a unique identifier and a public key stored by the messaging application 112 in the key store 300. Based on the received instruction, the call initiation module 305 obtains an encrypted entropy value from the encryption module 310. The entropy value is encrypted using the public key of the invited party such that only the invited party is able to decrypt the value. The call initiation module 305 transmits the received entropy value and the user identifier for the invited party to the chat server 135. In the case that multiple parties are invited to a call session, the call initiation module 305 sends each invited party a separate message containing the entropy value encrypted using the public key of the respective party, so that each invited party can separately decrypt the encrypted entropy value.

The encryption module 310 performs encryption-related functions for the messaging application 112. These functions may include generating and encrypting entropy values used to secure call sessions. In one embodiment, an entropy value is a 32-bit number generated using pseudo-random techniques. When a user instructs the call initiation module 305 to initiate a call to one or more invited parties, the encryption module 310 generates the entropy value to be used to secure the initiated call session. The encryption module 310 also encrypts the entropy values using the respective public keys associated with the invited parties. Additionally, the encryption module 310 may receive instructions from the chat server 135 to generate a new entropy value when the parameters of a call session change.

The encryption module 310 additionally uses entropy values participate in encrypted call sessions. As discussed above, a call session is secured using an entropy value, which may change over time as call parameters change. In one embodiment, the encryption module 310 uses the entropy value for a call session to generate one or more symmetric encryption keys for the session. In particular, the encryption module 310 generates an encryption key for communicating with another party of the call session based on a combination of the entropy value and an identifier unique to the other party. The identifier of the other party can be, e.g., a value derived at least in part from the phone number of the client device 110 used by the other party The encryption module 310 applies a key derivation function (KDF) that hashes the entropy value with the unique identifier of the other party to produce the symmetric encryption key. The encryption module 310 repeats this process for each party in a call session, thereby producing a distinct symmetric encryption key for each party. In addition, the encryption module 310 applies the KDF to the entropy value and the unique identifier of the local user of the client device 110, thereby producing a symmetric encryption key that can be used to decrypt communications sent to the local user by other parties of a call session.

The encryption module 310 uses the generated encryption keys to encrypt outgoing communication streams and decrypt incoming communication streams. In one embodiment, when participating in a multi-party call session, the encryption module 310 sends separate streams to each other party in the call session. Each stream is encrypted using the encryption key associated with the party to which it was sent (i.e., generated using the unique identifier of the receiving party). Likewise, the encryption module uses the encryption key for the generated using the unique identifier of the local user to decrypt communication streams sent by other parties to the local user. Accordingly, the parties of the call session are able to engage in a secure call session. The messaging system 130, and other users who are not parties of the call session, cannot eavesdrop on the call session because they lack access to the entropy value and cannot generate the required encryption keys.

The call interface module 315 generates a user interface during an encrypted call session that allows the user to view updates and make changes to the call parameters. When a call session is established between two or more users of the messaging application 112, the call interface module 315 generates an interface through which the user of the client device 110 participating in the call session can view information about the call and interact with the call session parameters. For example, the generated interface may allow a user to view identifiers associated with the participating parties, the duration of the call session, and other information. Additionally, the call interface module 315 receives updates from the update receipt module 320 to be displayed to the user of the client device 110. For example, the call interface module 315 may display an update when a user is added to the call session or terminates their connection to the call session. In one embodiment, the user may interact with the interface to transmit instructions to the chat server. For example, the user can add an additional user to the call session via an identifier associated with the additional user. In another example, the user can terminate their own connection to the call session.

Figure 4A:
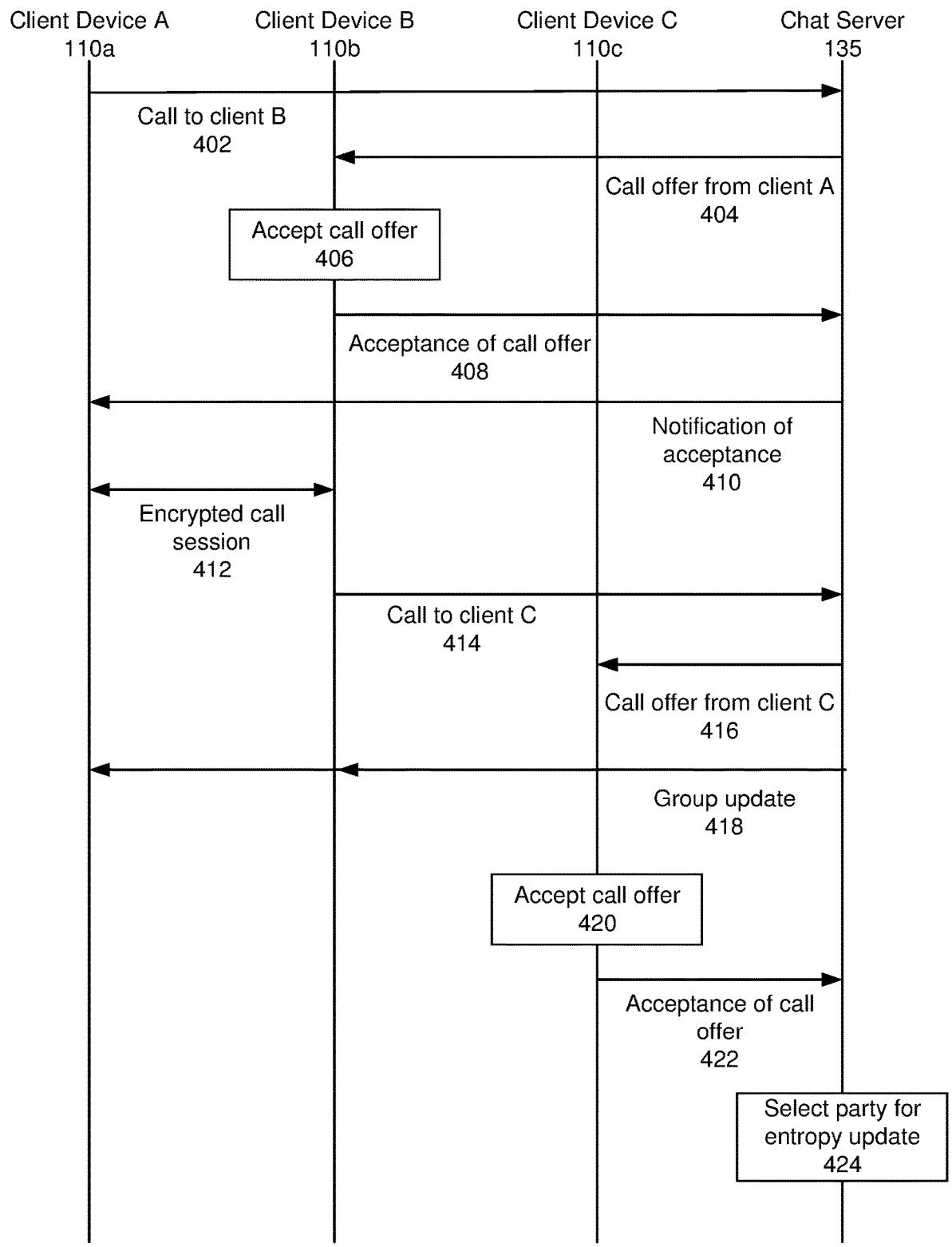
FIGS. 4A-4B are a transaction diagram illustrating interactions between a set of client devices A, B, and C and a chat server, in accordance with an embodiment.
Figure 4B:
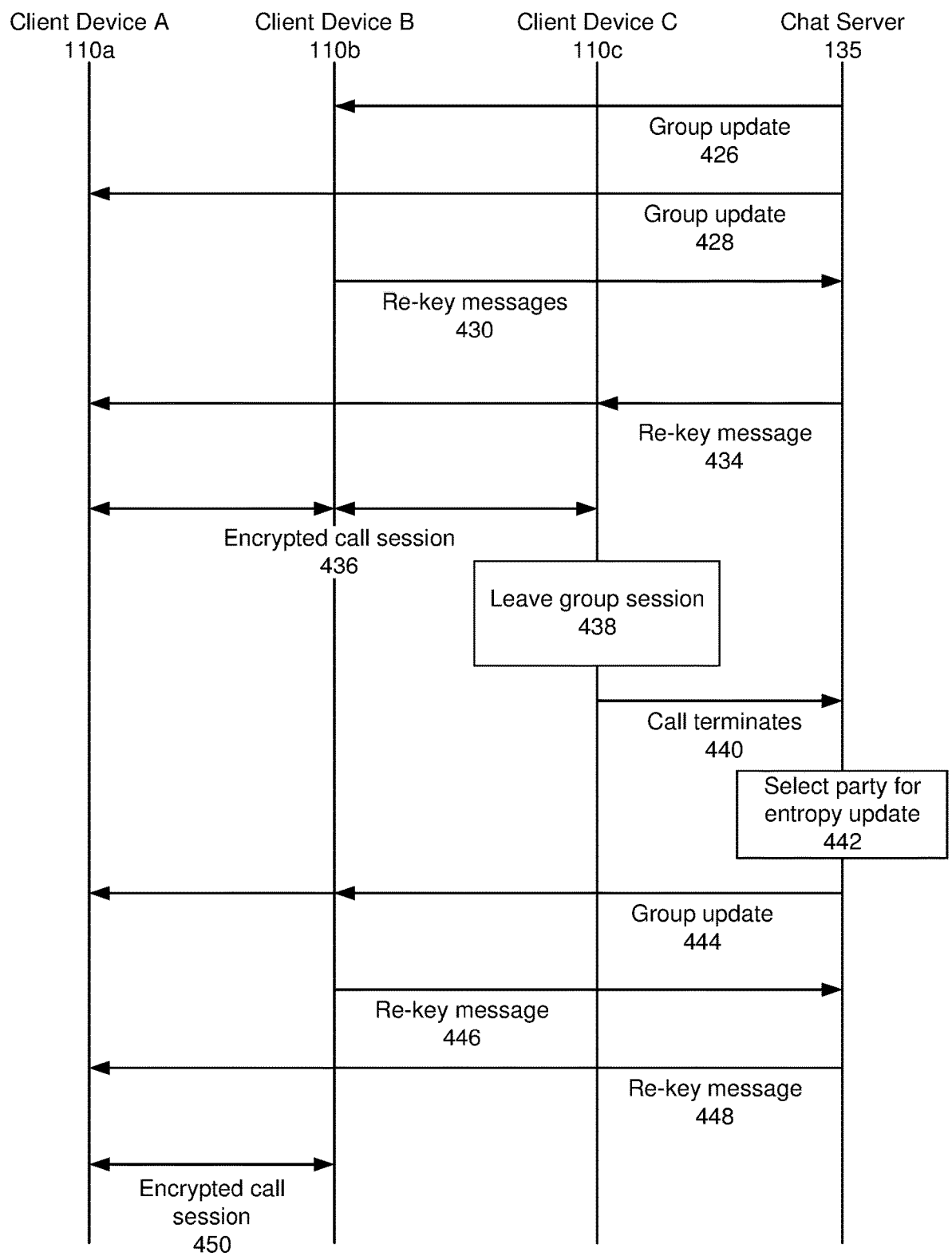

FIGS. 4A-4B are a transaction diagram illustrating example interactions between a set of client devices 110 and a chat server 135 to establish an encrypted call session, in accordance with an embodiment. A client device 110a transmits a call request 402 for a second client device 110b to the chat server 135. The call request includes an encrypted entropy value generated by the first client device 110a. The entropy value is encrypted so that only the second client device 110b can decrypt it. The chat server 135 transmits the call offer 404 from the first client device 110a to the second client device 110b, including the encrypted entropy value. The user of the second client device 110b accepts the call offer 406, and the second client device transmits a notification of acceptance 408 to the chat server 135. The chat server 135 transmits a notification of the second user's acceptance 408 to the first client device 110a. The first and second client devices 110 communicate via an encrypted voice session 412, using the encrypted entropy value generated by the first client device to secure the session.

During the encrypted voice session, the second client device 110b transmits a call request 414 for a third client device 110c to join the existing voice session to the chat server 135. The chat server 135 transmits the call offer 416 to the third client device 110c and transmits a group update 418 to the current parties of the voice session. The group update notifies the client devices 110 that an invitation for an additional party was transmitted by the chat server 135. The group update additionally contains the identifiers of the parties on the call and the status of the parties (e.g., connected, pending, leaving, etc.). The user of the third client device 110c accepts the call offer 420 and the third client device transmits a notification of acceptance 422 to the chat server 135. Upon receipt of acceptance from the third client device 110c, the chat server 135 selects a party 424 of the call to update the encrypted entropy value. In one embodiment, the chat server 135 selects a party based on the identifier numbers associated with the parties (e.g., selects the lowest phone number). In another embodiment, the chat server 135 selects a party based on the durations spent in the call by the parties (e.g., selects the longest participant). In other embodiments, the chat server 135 may select a party based on other factors, or at random. In the example shown in FIGS. 4A-4B, the second client device 110b is selected to generate an updated entropy value.

The chat server 135 transmits a group update 426 to the selected client device 110b. This update instructs the client device 110b to update the entropy value. Additionally, the chat server 135 transmits a group update 428 to the other parties in the encrypted voice session to inform them of the update. Upon receiving the instruction to update the encrypted entropy value, the selected party 110b generates a new entropy value and transmits a re-key message 430 to the chat server 135. The re-key message is used by client devices 110 of parties in the updated call session to update the encryption of the call session and contains the updated encrypted entropy value generated by the selected party. Updating the encryption of the call session ensures that the added party cannot access data previously shared in the call session. The chat server 135 transmits the re-key message 434 to the first client device 110a and the third client device 110c. Each transmitted re-key message is encrypted for the specific party (e.g., each party receives a separate re-key message with an entropy value encrypted for that party, or the re-key message contains a specific encrypted versions of the entropy value for each party). Using the encrypted entropy value contained in the re-key messages to generate keys for the session, the client devices 110 establish a group encrypted voice session 436 including the third client device 110c.

Parties in the group encrypted call session may leave at any time by terminating their connection to the session. In the example shown in FIGS. 4A-4B, the third client device 110c leaves the session 438. The client device 110c transmits a notification of the call termination 440 to the chat server 135. Because the parties in the encrypted call session change due to the third client device 110c leaving the session, the entropy value is updated to maintain call security and prevent the departing party from eavesdropping on the ongoing call. The chat server 135 selects a party to update the entropy value from among the client devices 110 remaining in the call session. As described above, a party may be chosen at random or using a heuristic based on identifiers or time. The selected party is not necessarily the same party selected to make a previous entropy update. In the example shown, the chat server 135 selects the second client device 110b to update the entropy value. The chat server 135 transmits a group update to the remaining parties 444 in the call session. The group update contains instructions for the selected party to update the encrypted entropy value of the session. The selected party 110b generates a new entropy value and transmits a re-key message 446 to the chat server 135. As described above, the re-key message contains the updated encrypted entropy value. The chat server 135 transmits the re-key message 448 to the first client device 110a. Using the encrypted entropy value contained in the re-key message, the first and second client devices 110 establish an encrypted call session 450. In one embodiment, the parties automatically terminate a call session if a re-key message with a new entropy value is not received after a threshold amount of time (e.g., 30 seconds) after receiving a group update message.

In other examples, the transactions and events may differ from those described in FIGS. 4A-4B. For example, the example of FIGS. 4A-4B can be extended to situations involving an arbitrary number of parties, wherein parties can leave or join the call at any time.

Figure 5:
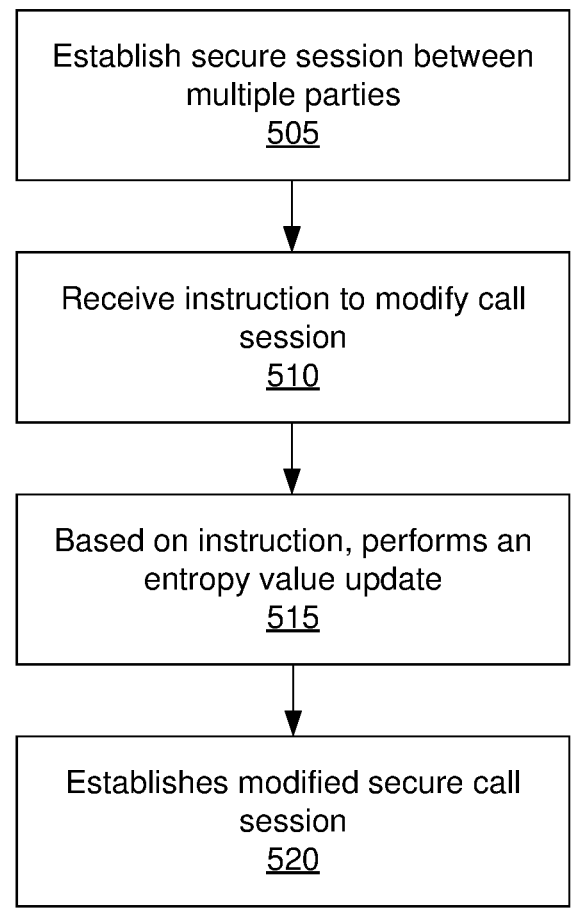
FIG. 5 is a flow chart illustrating a method of encrypting call sessions held between multiple users, in accordance with an embodiment.

FIG. 5 is a flow chart illustrating a method of encrypting video call sessions held between multiple users, in accordance with an embodiment. The steps of FIG. 5 may be performed by the messaging system 130. Some or all of the steps may be performed by other entities in other embodiments. In addition, other embodiments may include different and/or additional steps, and the steps may be performed in different orders.

The messaging system 130 establishes 505 a secure call session between multiple parties. The call session is encrypted using an entropy value generated by the initiating party. Use of the entropy value prevents the messaging system 130 from being able to access information exchanged among the parties in the call session. The messaging system 130 receives 510 an instruction to modify the parties in the call session. For example, the instruction may be to add an additional party to the call session or to remove a party from the call session. Based on the received instruction, the messaging system 130 performs 515 an entropy value update and establishes 520 a modified secure call session between the parties.

Figure 6:
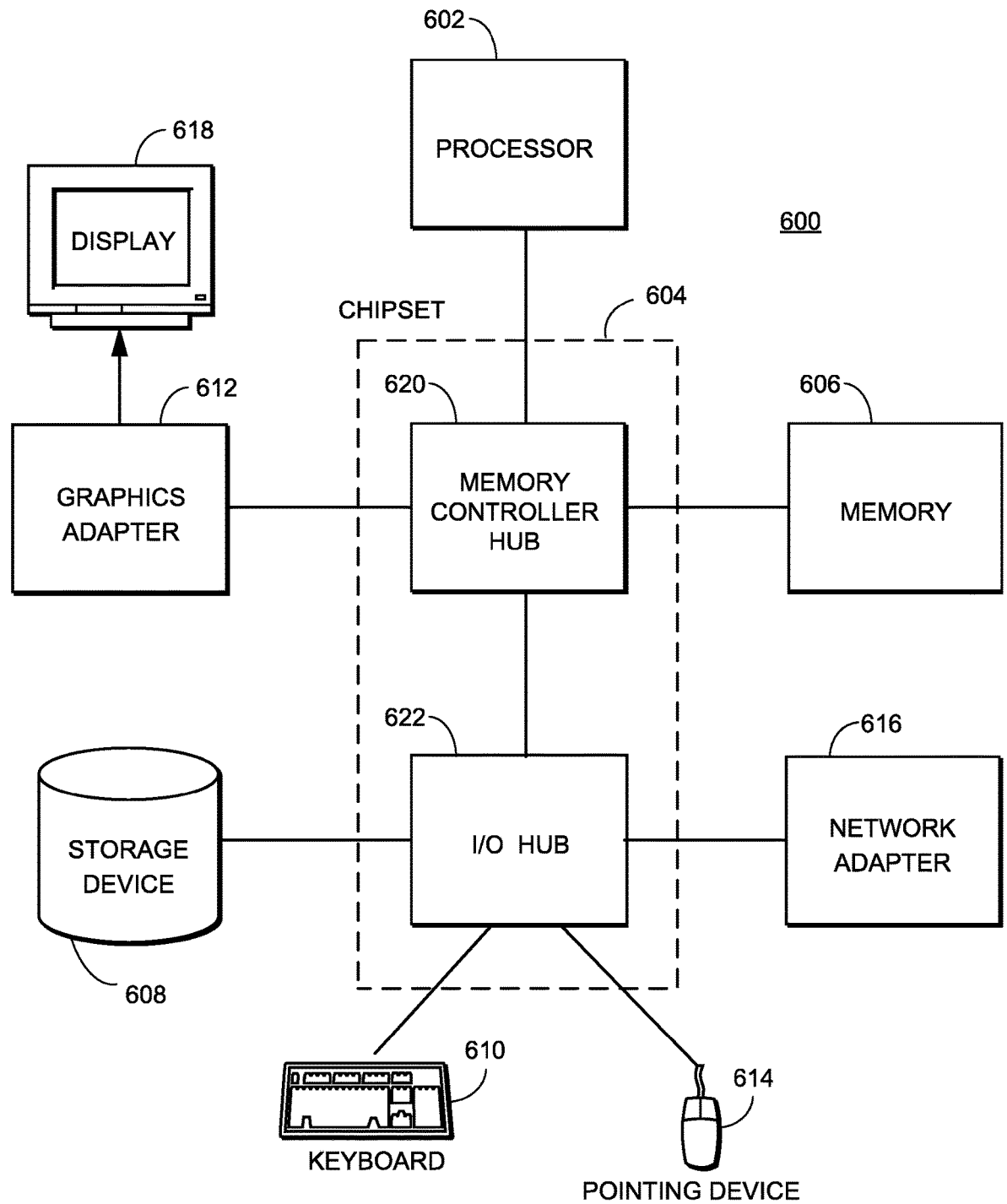
FIG. 6 is a high-level block diagram illustrating physical components of a computer used as part or all of one or more of the entities described herein in one embodiment.

FIG. 6 is a high-level block diagram illustrating physical components of a computer 600 used as part or all of one or more of the entities described herein in one embodiment. For example, instances of the illustrated computer 600 may be used as a server operating the messaging system 130. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O hub 622. In another embodiment, the memory 606 is coupled directly to the processor 602 instead of the chipset 604. In one embodiment, one or more sound devices (e.g., a loudspeaker, audio driver, etc.) is coupled to chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer 600. The graphics adapter 612 displays images and other information on the display 618. The network adapter 616 couples the computer system 600 to a local or wide area network.

As is known in the art, a computer 600 can have different and/or other components than those shown in FIG. 6. In addition, the computer 600 can lack certain illustrated components. In one embodiment, a computer 600 acting as a server may lack a keyboard 610, pointing device 614, graphics adapter 612, and/or display 618. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    establishing, using a messaging system, a call session between a plurality of parties, the call session encrypted using an entropy value to prevent the messaging system from accessing information exchanged among the plurality of parties in the call session, wherein the entropy value is a pseudo-random number generated by an initiating party of the plurality of parties;

receiving, by the messaging system, an instruction from a party of the plurality of parties to modify the call session;

causing, by the messaging system, the parties to update the entropy value to a new entropy value responsive to the instruction to modify the call session by:
- selecting, by the messaging system, a party in the call session to update the entropy value;
- transmitting, by the messaging system, an update instruction to the selected party, the update instruction instructing the selected party to generate the new entropy value;
- receiving, by the messaging system, a message from the selected party containing the new entropy value, the new entropy value in the message encrypted to prevent the messaging system from accessing the new entropy value; and
- providing, by the messaging system, the message from the selected party containing the new entropy value to another party of the call session, the other party adapted to access the new entropy value; and establishing, by the messaging system, a modified call session using the new entropy value.

2. The method of claim 1, further comprising:
sending, by the messaging system, a group update message to the plurality of parties in the call session responsive to receiving the instruction to modify the call session, the group update message informing the parties in the call session of the update to the new entropy value;
wherein the plurality of parties in the call session are adapted to terminate the call session responsive to not receiving the new entropy value within a threshold amount of time after the parties receive the group update message.

3. The method of claim 1, further comprising:
sending, by the messaging system, a group update message to the plurality of parties in the call session responsive to receiving the instruction to modify the call session, the group update message informing the parties in the call session of the update to the new entropy value;
receiving, by the messaging system, from the selected party, a re-key message containing the new entropy value, the new entropy value encrypted to prevent the messaging system from accessing the entropy value; and
forwarding the re-key message from the messaging system to another party of the plurality of parties;
wherein the other party is adapted to terminate the call session responsive to not receiving the re-key message within a threshold amount of time after the other party receives the group update message.

4. The method of claim 1, wherein establishing the call session comprises:
receiving a call offer from the initiating party of the plurality of parties, the call offer identifying a second party of the plurality of parties and including an entropy value encrypted so that only the second party can decrypt the entropy value;
forwarding the call offer to the second party;
receiving, from the second party, an acceptance of the call offer; and
notifying the initiating party of the acceptance of the call offer.

5. The method of claim 1, wherein receiving the instruction from the party to modify the call session comprises receiving at least one of: an instruction to add an additional party to the call session or an instruction to remove a current party of the plurality of parties from the call session.

6. A non-transitory computer-readable storage medium storing computer program instructions executable by a processor to perform operations comprising:
establishing, using a messaging system, a call session between a plurality of parties, the call session encrypted using an entropy value to prevent the messaging system from accessing information exchanged among the plurality of parties in the call session, wherein the entropy value is a pseudo-random number generated by an initiating party of the plurality of parties;

receiving, by the messaging system, an instruction from a party of the plurality of parties to modify the call session;

causing, by the messaging system, the parties to update the entropy value to a new entropy value responsive to the instruction to modify the call session by:
- selecting, by the messaging system, a party in the call session to update the entropy value;
- transmitting, by the messaging system, an update instruction to the selected party, the update instruction instructing the selected party to generate the new entropy value;
- receiving, by the messaging system, a message from the selected party containing the new entropy value, the new entropy value in the message encrypted to prevent the messaging system from accessing the new entropy value; and
- providing, by the messaging system, the message from the selected party containing the new entropy value to another party of the call session, the other party adapted to access the new entropy value; and establishing, by the messaging system, a modified call session using the new entropy value.

7. The computer-readable storage medium of claim 6, further comprising:
sending, by the messaging system, a group update message to the plurality of parties in the call session responsive to receiving the instruction to modify the call session, the group update message informing the parties in the call session of the update to the new entropy value;
wherein the plurality of parties in the call session are adapted to terminate the call session responsive to not receiving the new entropy value within a threshold amount of time after the parties receive the group update message.

8. The computer-readable storage medium of claim 6, further comprising:
sending, by the messaging system, a group update message to the plurality of parties in the call session responsive to receiving the instruction to modify the call session, the group update message informing the parties in the call session of the update to the new entropy value;
receiving, by the messaging system, from the selected party selected to generate the new entropy value, a re-key message containing the new entropy value, the new entropy value encrypted to prevent the messaging system from accessing the entropy value; and forwarding the re-key message from the messaging system to another party of the plurality of parties;

wherein the other party is adapted to terminate the call session responsive to not receiving the re-key message within a threshold amount of time after the other party receives the group update message.

9. The computer-readable storage medium of claim 6, wherein establishing the call session comprises:

receiving a call offer from the initiating party of the plurality of parties, the call offer identifying a second party of the plurality of parties and including an entropy value encrypted so that only the second party can decrypt the entropy value;

forwarding the call offer to the second party;

receiving, from the second party, an acceptance of the call offer; and notifying the initiating party of the acceptance of the call offer.

10. The computer-readable storage medium of claim 6, wherein receiving the instruction from the party to modify the call session comprises receiving at least one of: an instruction to add an additional party to the call session or an instruction to remove a current party of the plurality of parties from the call session.

11. A system comprising:

a computer processor for executing computer program instructions; and a non-transitory computer-readable storage medium storing computer program instructions executable by the processor to perform operations comprising:

establishing, using a messaging system, a call session between a plurality of parties, the call session encrypted using an entropy value to prevent the messaging system from accessing information exchanged among the plurality of parties in the call session, wherein the entropy value is a pseudo-random number generated by an initiating party of the plurality of parties;

receiving, by the messaging system, an instruction from a party of the plurality of parties to modify the call session;

causing, by the messaging system, the parties to update the entropy value to a new entropy value responsive to the instruction to modify the call session by:

selecting, by the messaging system, a party in the call session to update the entropy value;

transmitting, by the messaging system, an update instruction to the selected party, the update instruction instructing the selected party to generate the new entropy value;

receiving, by the messaging system, a message from the selected party containing the new entropy value, the new entropy value in the message encrypted to prevent the messaging system from accessing the new entropy value; and providing, by the messaging system, the message from the selected party containing the new entropy value to another party of the call session, the other party adapted to access the new entropy value; and establishing, by the messaging system, a modified call session using the new entropy value.

12. The system of claim 11, further comprising:

sending, by the messaging system, a group update message to the plurality of parties in the call session responsive to receiving the instruction to modify the call session, the group update message informing the parties in the call session of the update to the new entropy value;

wherein the plurality of parties in the call session are adapted to terminate the call session responsive to not receiving the new entropy value within a threshold amount of time after the parties receive the group update message.

13. The system of claim 11, further comprising:

sending, by the messaging system, a group update message to the plurality of parties in the call session responsive to receiving the instruction to modify the call session, the group update message informing the parties in the call session of the update to the new entropy value;

receiving, by the messaging system, from the selected party, a re-key message containing the new entropy value, the new entropy value encrypted to prevent the messaging system from accessing the entropy value; and forwarding the re-key message from the messaging system to another party of the plurality of parties;

wherein the other party is adapted to terminate the call session responsive to not receiving the re-key message within a threshold amount of time after the other party receives the group update message.

14. The system of claim 11, wherein establishing the call session comprises:

receiving a call offer from the initiating party of the plurality of parties, the call offer identifying a second party of the plurality of parties and including an entropy value encrypted so that only the second party can decrypt the entropy value;

forwarding the call offer to the second party;

receiving, from the second party, an acceptance of the call offer; and notifying the initiating party of the acceptance of the call offer.

* * * * *

UNITED STATES PATENT AND TRADEMARK OFFICE
CERTIFICATE OF CORRECTION

PATENT NO. : 10,666,693 B1
APPLICATION NO. : 15/965436
DATED : May 26, 2020
INVENTOR(S) : Ehren Andrew Kret et al.

Page 1 of 1

It is certified that error appears in the above-identified patent and that said Letters Patent is hereby corrected as shown below:

In the Claims

Column 12, Line 66, Claim 8, after "party" delete "selected to generate the new entropy value".

Signed and Sealed this
Fifteenth Day of December, 2020

Andrei Iancu
*Director of the United States Patent and Trademark Office*